US008185078B2

(12) United States Patent
Martens et al.

(10) Patent No.: US 8,185,078 B2
(45) Date of Patent: May 22, 2012

(54) DYNAMIC SPUR AVOIDANCE FOR HIGH SPEED RECEIVERS

(75) Inventors: Jon S. Martens, San Jose, CA (US); Oggi P. Lin, San Jose, CA (US); Thomas J. Albrecht, San Jose, CA (US); Peter A. Kapetanic, Morgan Hill, CA (US)

(73) Assignee: Anritsu Company, Morgan Hill, CA (US)

( * ) Notice: Subject to any disclaimer, the term of this patent is extended or adjusted under 35 U.S.C. 154(b) by 282 days.

(21) Appl. No.: 12/604,286

(22) Filed: Oct. 22, 2009

(65) Prior Publication Data

US 2011/0098014 A1    Apr. 28, 2011

(51) Int. Cl.
    *H04B 1/10* (2006.01)
(52) U.S. Cl. ......................................... 455/296; 455/307
(58) Field of Classification Search ............... 455/63.1, 455/63.2, 63.3, 67.13, 255, 256, 259, 260, 455/295, 296, 302, 307, 310; 375/346, 349
See application file for complete search history.

(56) References Cited

U.S. PATENT DOCUMENTS

| 5,640,697 | A  |   | 6/1997 | Orndorff |         |
|-----------|----|---|--------|----------|---------|
| 6,785,527 | B2 |   | 8/2004 | Earls    |         |
| 7,103,342 | B2 | * | 9/2006 | Kusbel et al. | 455/296 |
| 7,715,814 | B2 | * | 5/2010 | Manku et al. | 455/296 |
| 2008/0181340 | A1 | * | 7/2008 | Maxim | 375/346 |

OTHER PUBLICATIONS

Hietala, et al., entitled "Self-Shielded Quad-Band EGPRS Transceiver With Spur Avoidance", IEEE Trans. Micr. Theory Tech., vol. 57, Apr. 2009, pp. 910-918.

* cited by examiner

*Primary Examiner* — Thanh Le
(74) *Attorney, Agent, or Firm* — Fliesler Meyer LLP

(57) ABSTRACT

A system and method for implementing dynamic spur avoidance in a high speed receiver environment is provided. For a plurality of radio frequency (RF) input signal ranges, a range of intermediate frequency (IF) signals and a noise floor for each IF signal is determined. An identification of spurs that will affect the noise floor is also determined from a look up table for each range of the RF inputs. A frequency plan that sets local oscillator and constituent oscillator signals is selected such that the IF signals generated from the RF input will avoid lower order spurious responses of the identified spurs within the IF signal range.

20 Claims, 5 Drawing Sheets

DYNAMIC SPUR AVOIDANCE FOR HIGH SPEED RECEIVERS

FIELD OF THE INVENTION

The present invention relates to systems and methods for dynamic spur avoidance in high speed receivers.

BACKGROUND OF THE INVENTION

All high speed receivers generally experience some kind of spurious responses. These responses are often caused by undesired, but reasonably predictable, contamination signals riding on the radio frequency (RF) or local oscillator (LO) signals that convert unintentionally to the intermediate frequency (IF) signal, and hence get recognized as a desired response.

These contamination signals can arise from many sources, e.g., reference clocks, digital signaling frequencies, component frequencies used in the creation of the RF or LO signal and strong external interferers. Sometimes it is possible to avoid these spurious responses by dynamically changing the configuration of the receiver, such as by changing the constituent makeup of the RF or LO signal. The problem of spurious responses becomes more apparent in the case of a fast measuring receiver where speed is critical and even small spurious responses can be problematic. Some conventional techniques to reduce the effect of spurious responses with a high speed receiver are described with reference to FIGS. 1-3.

FIG. 1 is an example of a typical receiver 100. The receiver 100 includes a group of conversion stages $102_1$ through $102_n$. A common configuration, however, uses one conversion stage, or n=1, for both speed and cost reasons. In FIG. 1, the conversion stages $102_1$-$102_n$ can include local oscillators $118_1$-$118_n$ that mix with a RF input signal 104 to convert the RF signal 104 into IF signals $106_1$ through $106_n$. The conversion stages $102_1$-$102_n$ are each shown as a mixer but can be a harmonic sampler or other structure that converts the RF 104 signal into signals $IF_1$-$IF_n$. The $IF_1$ signal $106_1$ is provided through a bandpass filter 112 into the second conversion stage. After the final conversion stage $102_n$, the $IF_n$ signal $106_n$ is provided through a bandpass filter 114 into analog-to-digital (A/D) converter 116.

In an exemplary embodiment that illustrates how a spurious response arises with the circuitry of FIG. 1, consider a single conversion stage (n=1) where the IF signal is 20 MHz, the RF signal is 20 GHz and the LO is set at 20.02 GHz. Consider further that the LO is contaminated with 4 MHz spurious response from a digital clock and has sidebands spaced at 10 MHz from the carrier (for 4 harmonics in each direction) due to the frequency reference of a synthesizer. Suppose also that the LO is generated by combining a multiple of a 4.995 GHz oscillator and a direct digital synthesizer (DDS) set at 40 MHz. A spurious response can arise for several reasons. First, the 5$^{th}$ harmonic of the 4 MHz digital clock can land right on the IF signal. Second, the 20 MHz offset sideband on the LO can self-mix with the LO to produce the IF signal. Third, the DDS leakage can mix with the harmonics of the digital clock or downconverted versions of the LO sidebands to produce the IF signal. Fourth, multiples of the 4.995 GHz leakage can mix with the RF signal to produce the undesired IF signal. The spurious generation of the IF signal can overwhelm the desired signal, particularly if the RF signal is low in amplitude.

In the past, several techniques using multiple conversion stages have been employed to avoid spurious responses. One reason multiple conversion structures are used to avoid spurious responses is because the intermediate filtering performed at each conversion stage can sometimes be used to reduce spurious responses. For example, see U.S. Pat. No. 6,785,527, entitled "Conversion spur avoidance in a multi-conversion radio frequency receiver" (Earls), filed Apr. 2, 2001, and U.S. Pat. No. 5,640,697, entitled "Wideband multiple conversion receiver system with means for avoiding receiver spurs by combined switching of multiple local oscillator frequencies" (Orndorff), filed Jun. 7, 1995. Systems of both these patents dynamically modify the first IF signal in a two-conversion system to avoid specific problems. However, often the final conversion to an IF signal is not changed since either a) the final IF signal is a conversion to direct current (DC), or b) changing the final IF signal would require A/D clocking changes, and hence, problems associated with clocking the output digital data stream. Thus, the previous IF signal is changed as needed to avoid spurs.

In order to effectively change an IF signal to avoid spurious responses, an analysis similar to that performed in section II.C of A. Hietala, et al., entitled "Self-shielded quad-band EGPRS transceiver with spur avoidance", IEEE Trans. Micr. Theory Tech., Vol. 57, April 2009, pp. 910-918; can be performed to determine where spurious responses occur. The Hietala system is a two conversion system, with the first conversion mode being dynamic. The final IF signal is at DC so the last conversion stage is not altered. The possible mix of products of the various signals in Hietala and the conditions of a spurious response are often expressed as the following (where k signals are considered):

$$f_{IF} - \Delta \leq n_1 f_1 \pm n_2 f_2 \pm \ldots \pm n_k f_k \leq f_{IF} + \Delta,$$

where if only integer multiples are considered, then the $n_i$ are integers representing possible spurious responses. In some cases, the $n_i$ may only be rational numbers. Since a larger $n_i$ tends to correspond to lower amplitude spurious responses (mixing processes get much less efficient at higher orders, usually at the rate of $\log_{10}(n_i)$), there will usually be an upper limit on the size of $n_i$ that is a concern. The parameter $\Delta$ describes the range of concern and is normally related to the bandwidth of the final IF system.

When a spurious response that is of concern is identified, the $f_{IF}$ may be moved, or some of the constituent signals may be changed to avoid the spurious response. To better understand how the constituent oscillator changes can help, consider the exemplary embodiment described above. Instead of combining a multiple of a 4.995 GHz synthesizer and a 40 MHz DDS, one might use a 4.997 GHz synthesizer setting and a 32 MHz DDS setting. This configuration will cause fewer issues with the given IF signal since some of the constituent signals have been changed.

A disadvantage to making slight adjustments to $f_{IF}$ at individual frequencies to remove a spurious response, particularly for measuring receivers, is that there are varying levels of concern about the removed spurious response depending on how the measurement is setup. For example, when operating the receiver at very high speeds over wide bandwidths, the range of concern increases (due to the wide bandwidth) but the level of concern decreases since the noise floor will be higher, thus masking some low level spurs. If operating at low speed over narrow bandwidths, the range of concern decreases since bandwidth is not wide while the level of concern increases since spurs are now more pronounced. The traditional approach of adjusting $f_{IF}$ to remove a spurious response ignores how the measurement is setup, and hence may try to avoid too many spurious responses (thus slowing down the operation), or avoid too few spurious responses.

Returning to the use of multiple conversion receivers, FIG. 2 illustrates an alternative approach to avoiding spurious responses. In FIG. 2, an input RF signal 208 is passed to receivers $216_1$-$216_q$. The receivers $216_1$-$216_q$ respectively each include bandpass filters $222_1$-$222_q$, LOs $202_1$-$202_q$ and A/D converters $228_1$-$228_q$. Each receiver has a different frequency plan as a result of the different components in each receiver. Due to the different frequency plan, each receiver will produce a different spurious response. As such, at any given input RF signal 208, the best receiver (in the sense of the least amount of spurious response on IF signals $210_1$-$210_q$) can be chosen. However, similar to the approach discussed in FIG. 1, a disadvantage is that this technique is costly and complex.

FIG. 3 illustrates a related approach to FIGS. 1-2. As illustrated in FIG. 3, there is a single conversion stage 302 but multiple A/D stages (stages $304_1$-$304_q$). The input RF signal 310 is converted at conversion stage 302 into IF signals $312_1$-$312_q$. Each IF signal is passed to respective A/D stage $304_1$-$304_q$. The IF signal at each A/D stage is then passed through respective bandpass filter $318_1$-$318_q$ to A/D converter $324_1$-$324_q$. By using multiple A/Ds, the digital data stream complexity is reduced at the expense of complex clocking systems and parallel processing paths. However, because of all the components, this approach is still costly and complex.

Another approach that is sometimes used to avoid spurious responses, particularly at lower frequencies, is direct digital acquisition. That is, the RF signal is directly sampled by an A/D converter and the results digitally filtered. However, a disadvantage to this approach is that it has limited bandwidth (or is quite expensive if bandwidth is not limited), can be slow and can be sensitive to strong interferers that saturate the A/D converter.

SUMMARY OF THE INVENTION

Embodiments of the present invention provide methods and systems to overcome the previously described problems with spur avoidance in high speed receivers where speed and the degree of avoidance are important. The system includes a hardware aspect where the single (or final) intermediate frequency (IF) conversion is dynamically changed based on aspects of the current radio frequency (RF) measurement to avoid spurious responses. The system further includes an algorithmic component to select a more optimum frequency plan that avoids spurious responses based on noise floor/bandwidth information provided using a lookup table and spur computations determined by a formula with minimal penalty to measurement speed.

A system according to the embodiments of the present invention that provide dynamic spur avoidance include a receiver with a final receiver downconverter having a variable local oscillator (LO) input, an IF output set with the LO to avoid spurs and an input radio frequency (RF) signal. An IF filter is connected to the downconverter IF output. The output of the IF filter is provided to an A/D converter that is driven by a variable frequency sample clock. The output of the A/D converter is then provided to a buffer with operation speed controlled by a variable frequency transit clock. The buffer output is provided for subsequent digital processing. A training signal can be applied to the IF filter input to determine any required gain calibration coefficients. The composite receiver has a system noise floor that is dependent on system settings. The characteristics of this noise floor are used to form a look up table as described in the algorithmic aspect of embodiments of the present invention. The frequencies of the LO, sample clock, constituent oscillators and the transit clock can be selectively controlled based on this spur avoidance algorithm once a desired IF scheme is selected.

According to an algorithmic aspect of the present invention, a plurality of RF input frequencies are provided, and for each RF frequency, a corresponding range of IF bandwidths, and a noise floor for each IF bandwidth are available from a lookup table. The lookup table can be used to determine the noise floor level for each IF bandwidth that has been previously created. Thus, for each of the RF input frequencies, the lookup table includes the range of IF bandwidths available for each of the RF frequencies and the noise floor for each IF bandwidth. Next, for each IF bandwidth from the look up table, a computation is performed to identify spurious responses that will affect the noise floor. Spurious responses can affect the measurement if the spur amplitude exceeds nominal noise floor levels.

Upon identifying the spurious responses that will affect the noise floor, a frequency plan can be selected that sets the constituent oscillator signals, the IF frequency, the frequency of the A/D sample clock and the frequency of the transit clock driving the buffers following the A/D converter such that the IF signals generated from the RF input signal will avoid the lower order spurious responses. Using the look up table and computations allows the acquisition system to adapt to spurious responses so as to maximize speed, while allowing the constituent oscillators to be simple and faster.

In one embodiment, in addition to adjusting the constituent oscillator signals, IF filtering can be adjusted so as to eliminate spurious responses likely to be encountered. For application-specific situations where known large interferers exist, this filtering is analog. For more frequency-specific cases, such as lower frequencies where many crossing spurs exist, digital filtering can also be used to adapt the system to eliminate spurs.

Using systems of embodiments of the present invention, dynamic spur avoidance can be based on the measurement IF bandwidths, averaging and time delays. For wider effective bandwidths, the range for detecting spurious responses can be expanded in scope but reduced in depth. For these wider bandwidths, the problematic spurious responses land further from the IF. However, only lower order harmonic multiples of constituent signals are considered since the spur amplitude would have to be larger to exceed nominal noise floors. For narrower effective bandwidths, the range for detecting spurious responses can be constrained in scope but increased in depth. For these narrower bandwidths, a smaller scan range about the IF can be used. However, higher harmonic multiples are considered in this case since lower amplitude spurs can affect the noise floor. Additionally, for narrower bandwidths, searching for spurs at greater depths has a larger effect on overall spur search time, but overall measurement time is least affected since it is increased only when it is most critical.

DETAILED DESCRIPTION OF THE INVENTION

Figure 1:
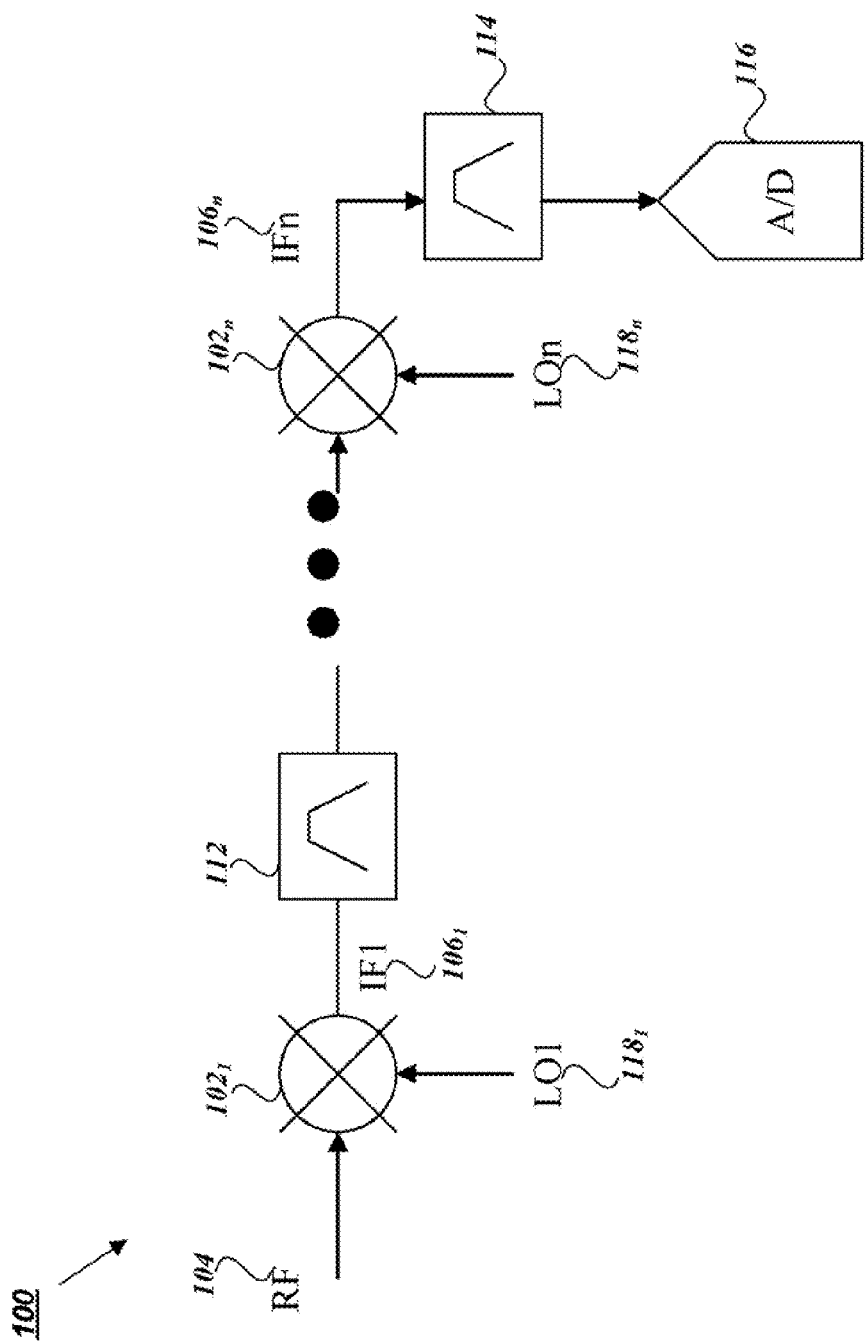
FIG. 1 illustrates a traditional system for avoiding spurious responses in a high speed receiver environment using multiple conversion stages in series.
Figure 2:
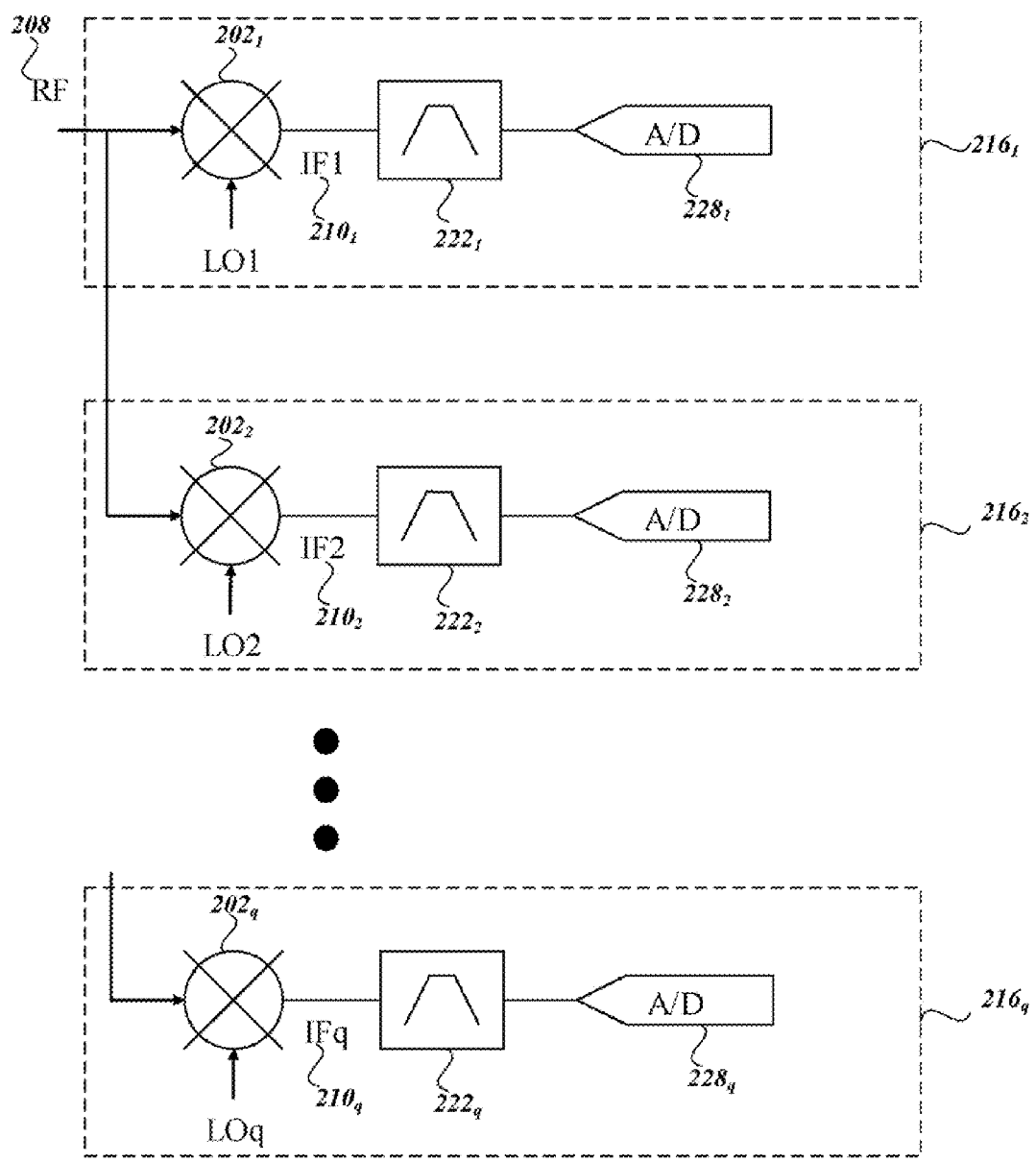
FIG. 2 illustrates a different traditional system for avoiding spurious responses in a high speed receiver environment using multiple parallel receivers with different frequency plans.
Figure 3:
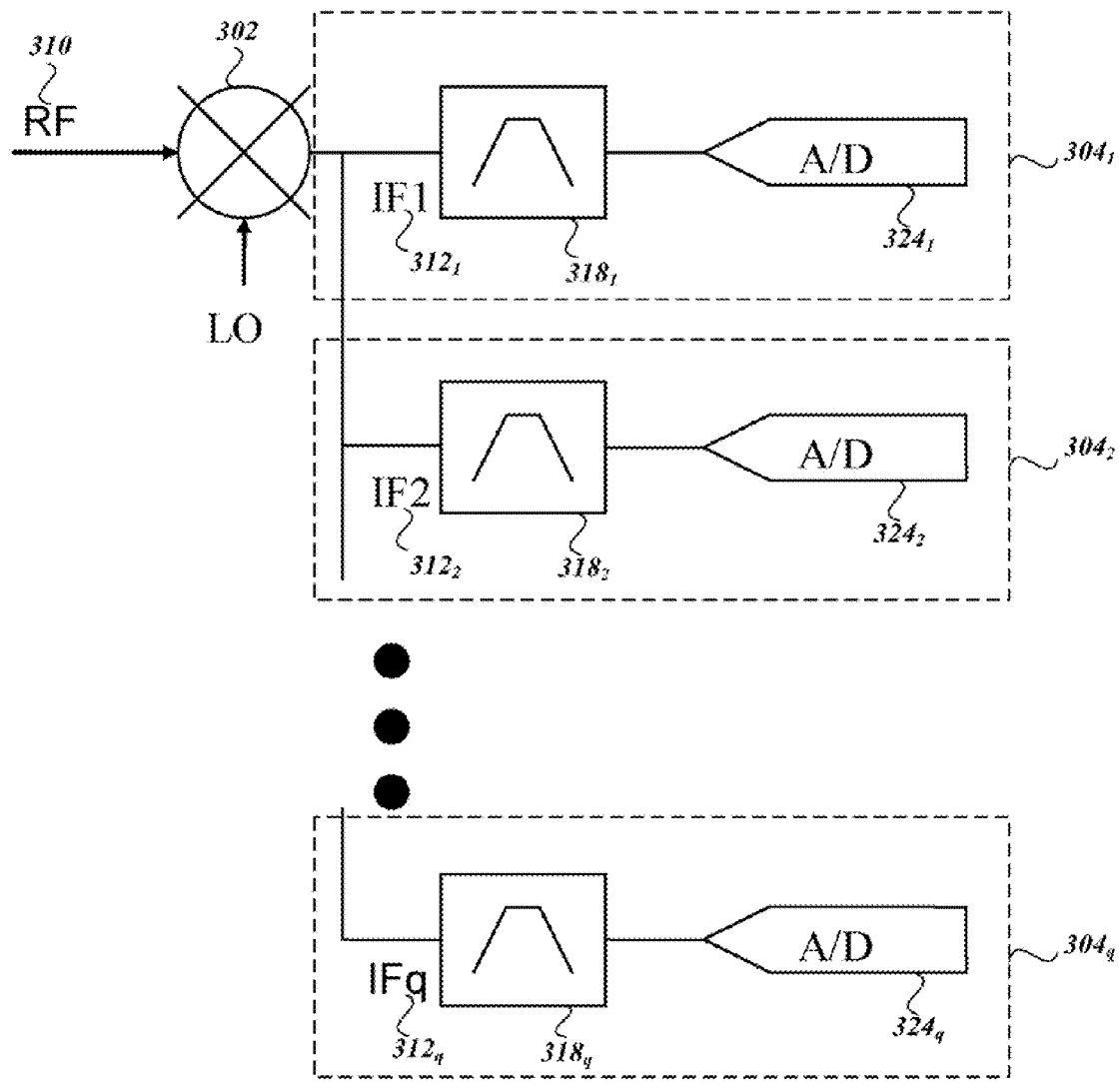
FIG. 3 illustrates a different traditional system for avoiding spurious responses in a high speed receiver environment using a single downconversion stage but a multiple analog-to-digital converter chains and filters.
Figure 4:
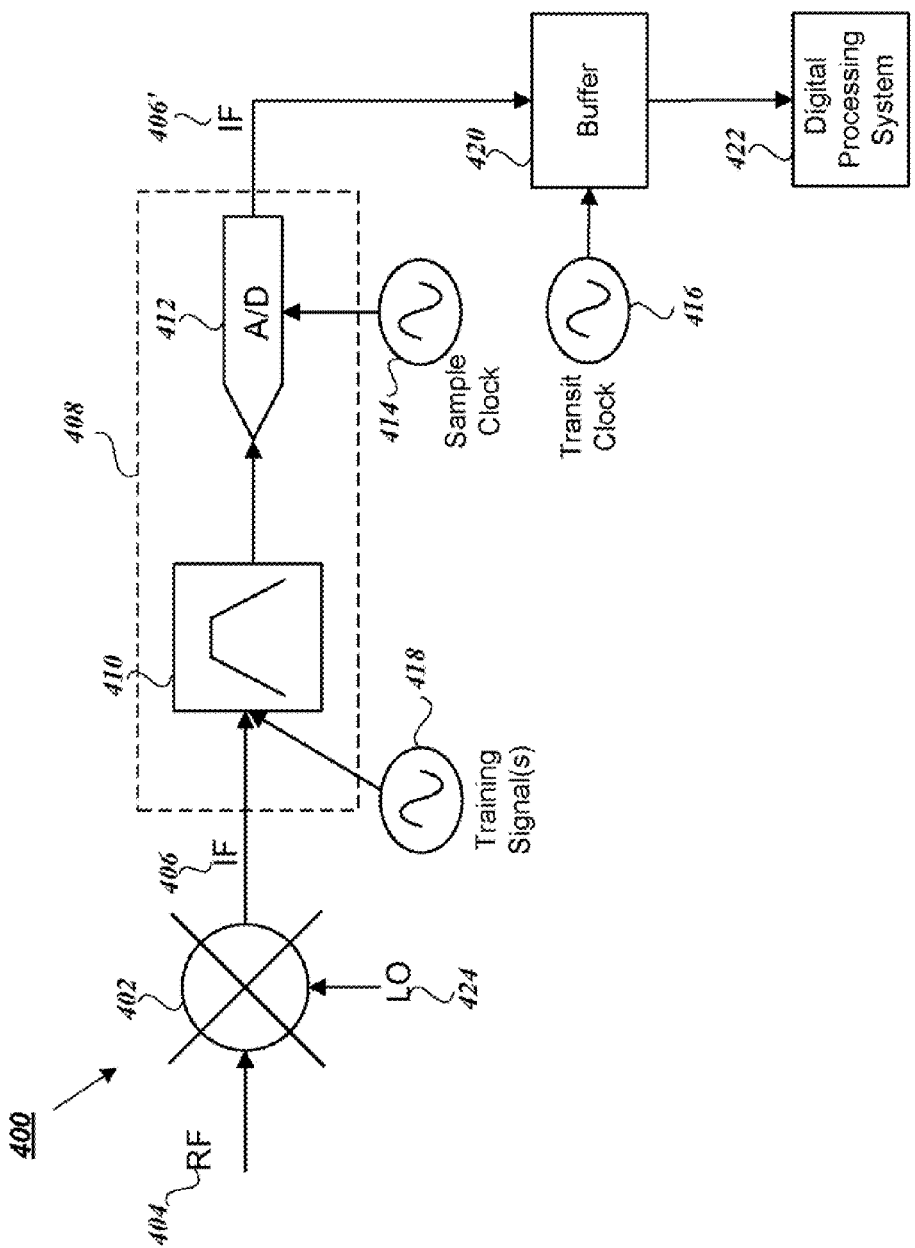
FIG. 4 illustrates a system for avoiding spurious responses in a high speed receiver environment according to embodiments of the present invention.

FIG. 4 illustrates components of a measuring receiver system 400 for avoiding spurious responses in a high speed receiver environment according to embodiments of the present invention. The measuring receiver system 400 includes a downconversion stage 402. The downconversion stage receives a radio frequency (RF) input signal 404 and converts the RF input signal 404 into an intermediate frequency (IF) signal 406. The term measuring receiver and measurement are used here, but the techniques apply as well to general receivers where a large dynamic range and fast frequency switching are required.

The IF signal 406 is accepted into an IF section 408. IF section 408 can include an IF filter 410 (here shown to be a bandpass filter) and an analog-to-digital (A/D) converter 412. An example of the IF filter can be an anti-aliasing filter. When using the anti-aliasing filter, the range of IF frequencies available for each RF frequency can be determined based on the pass band of the anti-aliasing filter. Depending on the system, the IF filter 410 may be a switched filter (e.g., different filters for certain ranges of IF frequencies) or may be continuously variable, or may be a single filter. Because aliased responses cannot be filtered digitally after the A/D converter 412 or because of potentially strong interfering signals contained within the IF signal 406, it is sometimes desired that IF filter 410 be analog. After the IF signal 406 is processed at the IF section 408, the converted IF signal 406' is passed through a buffer 420 before being transmitted to the rest of the digital processing system 422.

As indicated in the background, a receiver spur avoidance process providing variable IF signals were generally not used due to complications involving handling the data stream. These past schemes sometimes heavily oversampled data so that the IF signal can move while the data rate remains unchanged. The approach was slow since many samples must be taken to allow adequate processing of the final IF signal.

To provide a spur avoidance process with a variable IF signal, in embodiments of the present invention, in order to minimize measurement time at the IF section 408, a sample clock 414 is tied to the IF signal 406 so that the same minimal-count Discrete Fourier Transform (DFT) can be performed at any chosen IF signal. Additionally, in order to maintain data validity in the measuring receiver system 400, the transit clock 416 has its rate set to exceed the highest allowable rate of sample clock 414 and the resulting IF signal 406' is passed through a FIFO (or similar memory structure) buffer 420 controlled by the transit clock 416 to allow for synchronization.

A training signal 418 is applied at the input of IF filter 410 to allow calibration of any required gain coefficients or path responses. While this training signal is shown applied at IF filter 410, it may be provided at the RF side before the downconversion stage 402. The training signal 418 should cover the possible range of IF frequencies and is tied to the IF frequency that ends up being selected. Independently, the noise floor across IF frequencies and bandwidths must be determined, as discussed subsequently with respect to FIG. 5, so a table can be created that can be indexed against that frequency as well as against gain/configuration state. Once the IF frequency is selected based on the spur avoidance routine (of FIG. 5), the LO 424 is provided with an appropriate offset from the RF input signal 404, all constituent oscillators are set, the IF filter 410 is selected and the sample clock 414 frequency is changed.

In an exemplary implementation of measuring receiver system 400, to select one of three IF frequencies with minimal spurs based on a spur avoidance algorithm discussed subsequently with respect to FIG. 5, consider a system with three possible IF frequencies (12.35 MHz, 13.65 MHz and 10.7 MHz). For the three possible IF frequencies, a three branch switched filter is used for the IF filter 410, and DFTs are based on five points per cycle. This configuration results in sampling clock 414 frequencies of 15.4375 MHz, 17.0625 MHz and 13.375 MHz. The IF filters 410 have their three branches centered at the IF frequencies of 12.35 MHz, 13.65 MHz and 10.7 MHz, and a transit clock 416 is set such that the frequency of operation exceeds the maximum sample clock rate as required. In this case, 20 MHz. After selecting the best IF frequency based on the spur avoidance routine discussed with respect to FIG. 5 (in terms of least spurious responses), a LO is placed at the appropriate offset from the input RF signal, constituent oscillators are set, and the IF filter 410 is set accordingly, as is the frequency of sample clock 414 and transit clock 416.

Figure 5:
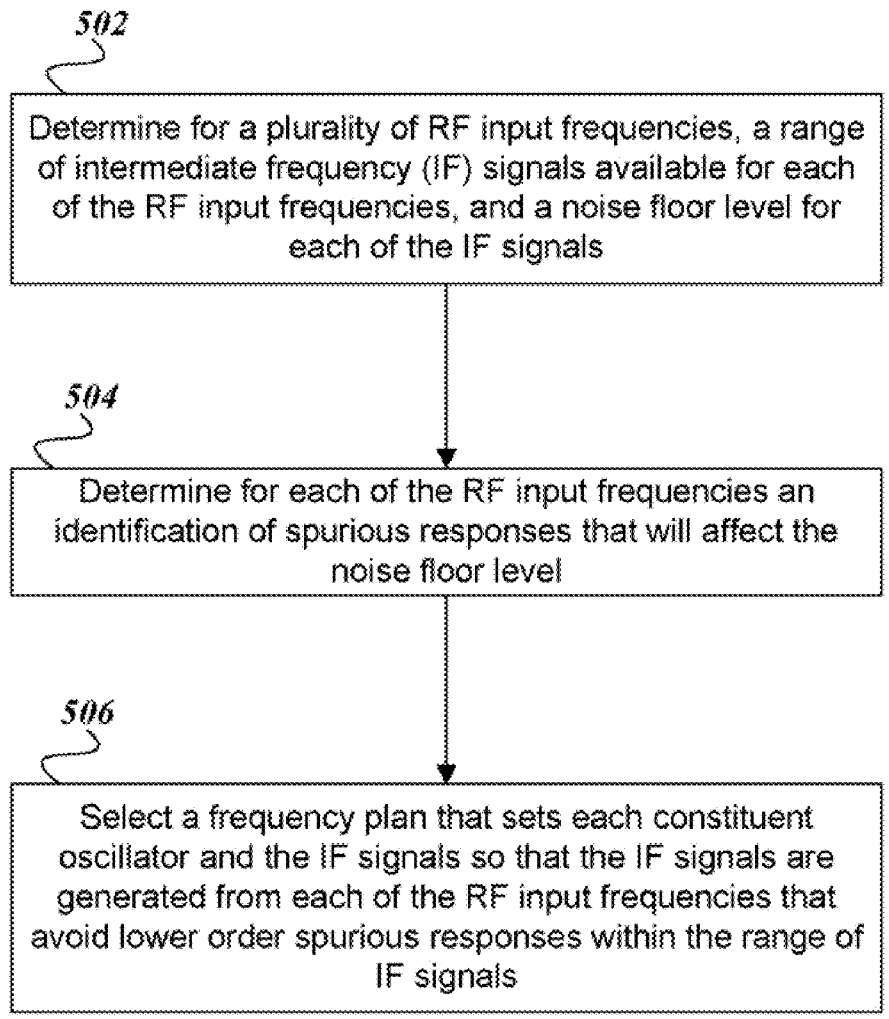
FIG. 5 is a high-level flow diagram that is used to explain avoiding spurious responses in a high speed receiver environment according to embodiments of the present invention.

FIG. 5 is a high-level flow diagram that is used to explain a method of avoiding spurious responses in a high speed receiver environment according to embodiments of the present invention. At step 502, a plurality of RF input signal (RF input signal 404) frequencies, a range of IF signal (IF signal 406) frequencies available for each of the RF input signal ranges and a noise floor for the IF signals is determined. The net noise floor can be determined as a function of effective IF bandwidth, which is a combination of the digital filtering bandwidth, the analog anti-alias filter bandwidth and any point-based averaging that may be used. For a range of bandwidths, this can be expressed as:

$$\text{Effective IF bandwidth} = \min(\text{analog BW}, \text{digital BW})/\#\text{avgs},$$

where analog BW is the analog bandwidth, digital BW is the digital bandwidth and avgs is the point-based averaging.

The effective bandwidth determines the net noise floor for a given configuration as well as the operation speed. Other configurable portions of the receiver can also be factored into this value (e.g., variable RF gain or if different downconversion paths can be selected) so that a consistent measure of noise floor can be obtained. For a given receiver and a given effective IF bandwidth, the noise floor can be evaluated using traditional data acquisition techniques. From this information, a lookup table can be consulted for each of the RF frequencies to determine the noise floor relative to IF signal. The lookup table (which may be a function of the IF signal selected as well as the RF signal) thus identifies the range of IF signals of interest and the relevant noise floor:

TABLE 1

| Effective IF bandwidth | IF Region of concern | Noise floor |
|---|---|---|
| A1 Hz | B1 Hz | C1 dBm |
| A2 Hz | B2 Hz | C2 dBm |
| A3 Hz | B3 Hz | C3 dBm |

At step 504, for each RF frequency, an identification of spurs that could be significant relative to the noise floor can be determined. The noise floor level can be determined for each IF frequency (and bandwidth selection) as discussed previously. The spurs can then be identified using the following equation:

$$f_{IF}-\Delta \leq n_1 \cdot f_1 \pm n_2 \cdot f_2 \pm \ldots \pm n_k f_k \leq f_{IF}+\Delta, \quad \text{(equation 1)}$$

where delta is the IF bandwidth region of concern, $f_{IF}$ is the candidate IF frequency and the $n_i$ are the weights (orders) of each of the constituent frequencies ($f_i$). The level of the spur can be estimated from the $n_i$ and compared to the noise floor found in the look up table. Finally, at step 506, a frequency plan that sets the constituent oscillators and the IF is selected such that IF signals are generated for the RF input that will avoid lower order spurious responses of the identified spurs within the IF signal range in the lookup table.

Consider the following example using Table 1 to illustrate identifying and avoiding spurious responses in a receiver environment. A1=10 Hz, A2=100 Hz, A3=1000 Hz, B1=50 Hz, B2=300 Hz, B3=2500 Hz, C1=−120 dBm, C2=−110 dBm and C3=−100 dBm. For each effective bandwidth Ai, a region of concern (corresponding to the Δ in the equation used to identify the spurs) can be defined from the Bi based on the receiver performance. The Ci values determine what order of spurs ($n_i$) are of importance (the maximum spur amplitude should be near or below the noise floor amplitude in most cases). The relationship between $n_i$ and the Ci will be dependent on the particular receiver design and class of spur, but the resulting Ci often varies as the log of $n_i$. According to this information, an optimal frequency plan is selected (e.g., a frequency plan that results in spurious responses of the highest order). The LO signal is set to match the selected IF signal, the bandpass filter is set, the frequencies of the A/D sample clock is set and the transit clock driving the buffers is set. Upon making these settings, test measurements can be made.

To reiterate the process of spur avoidance in a high speed receiver, a short synopsis of the steps is as follows. First, the RF frequency is defined along with bandwidth. Second, IF regions of concern are identified and a noise floor estimate is determined from a lookup table, with the lookup table values for noise floor previously. Third, an estimate of order of spur that could cause a problem is computed and equation 1 is applied to find the spurs. Fourth, once a frequency plan is selected to avoid spurs components of the receiver, the IF signal, the constituent oscillators, IF filters, sample clock and transit clock are set. Finally, measurements are made.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the claimed invention. For example, it would be possible to combine or separate some of the steps shown in FIG. 5 without substantially changing the overall events and results.

Embodiments of the present invention include a computer program product provided in a storage medium having instructions stored thereon/in which can be used to control a processor to perform processes according to embodiments of the present invention. For example, the software can cause the processor to determine IF frequencies of interest, the noise floor and spurs within the IF frequencies of interest, and provide access to look up tables containing this information. The software can further control the processor to set the gain levels, clock rates, and LO signal ranges to control IF frequencies within the system. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

What is claimed is:

1. A method for providing dynamic spur avoidance of an input radio frequency (RF) signal, comprising the steps of:
   determining for a plurality of RF input frequencies, a range of intermediate frequency (IF) signals available for each of the RF input frequencies, and a noise floor level for each of the IF signals;
   determining for each of the RF input frequencies an identification of spurious responses that will affect the noise floor level;
   selecting a frequency plan that sets each constituent oscillator and the IF signals so that the IF signals are generated from each of the RF input frequencies that avoid lower order spurious responses within the range of IF signals.

2. The method of claim 1 wherein the noise floor level is computed for each of the IF signals.

3. The method of claim 1 wherein the range of IF signals available for each of the RF input frequencies is determined based on a pass band of an IF filter.

4. The method of claim 3, further comprising: providing the IF filter in series with an analog-to-digital converter that is followed by a digital processing circuit, wherein the digital processing circuit further provides filtering of an output of the analog-to-digital converter, and wherein the range of IF signals available for each RF input signal is further determined by the digital pass band of the filtering performed in the digital processing circuit.

5. The method of claim 4, further comprising: prior to taking a measurement of one of the RF input frequencies, an IF plan is determined and constituent oscillators are set to match the IF plan, the filter bandwidth is set to match the IF plan and a sampling clock of the analog-to-digital converter is set to match the IF plan.

6. The method of claim 3 wherein the IF filter is an anti-aliasing filter.

7. The method of claim 1, further comprising: generating a lookup table for each of the RF input frequencies, and wherein the lookup table specifies the range of IF signals available for each of the RF input frequencies, and the noise floor level for the IF signals as a function of bandwidth.

8. The method of claim of claim 1 wherein an equation used to identify the spurious responses comprises: $f_{IF}-\Delta \leq n_1 \cdot f_1 \pm n_2 \cdot f_2 \pm \ldots \pm n_k f_k + \Delta$, wherein Δ is the IF bandwidth region of concern, $f_{IF}$ is one of the frequencies within the IF bandwidth region, and $n_i$ are the weights of constituent frequencies $f_k$.

9. A device providing for dynamic spur avoidance, the device comprising:
   a downconverter receiving a radio frequency (RF) input signal frequency, a local oscillator (LO) signal, and providing an RF output signal frequency;
   a local oscillator having a signal control input and having a LO output providing the LO signal to the downconverter;
   an intermediate frequency (IF) filter having an IF bandwidth control input, and an IF input receiving the output of the downconverter and providing an output;
   an analog-to-digital (A/D) converter having an input connected to the output of the IF filter, and having an output;

one or more constituent oscillators that provide the LO and RF input signals;

a digital processing circuit connected to the output of the A/D converter;

a memory device controlling the digital processing circuit to:

identify for the RF input signal frequency provided to the device one of a plurality of ranges of IF signals available, identify within the plurality of ranges of IF signals available a frequency plan for the RF input signal frequency that avoids lower order spurious responses within the respective range of IF signals, and control the input of the local oscillator to set the LO signal, the IF signals and the IF filters to operate within the frequency plan for the RF input signal frequency.

10. The receiver of claim 9, further comprising a clock connected to a clocking control input of the A/D converter, and wherein the memory further controls the digital processing circuit control the clock to set a sampling rate of the A/D converter to enable operation within the frequency plan for the RF input signal frequency.

11. The receiver of claim 10, wherein the memory includes a lookup table that stores, for different ones of the RF input signal frequencies, a corresponding set of IF bandwidths and respective noise floors.

12. The receiver of claim 9, further comprising a training signal generator connected to the input of the filter to provide training signals to enable the digital processing circuit to determine appropriate calibration coefficients.

13. A non-transitory computer readable storage medium storing one or more sequences of instructions for providing dynamic spur avoidance of an input radio frequency (RF) signal which instructions, when executed by one or more processors, cause the one or more processors to carry out the steps of:

determining for a plurality of RF input frequencies, a range of intermediate frequency (IF) signals available for each of the RF input frequencies, and a noise floor level for each of the IF signals;

determining for each of the RF input frequencies an identification of spurious responses that will affect the noise floor level;

selecting a frequency plan that sets each constituent oscillator and the IF signals so that the IF signals are generated from each of the RF input frequencies that avoid lower order spurious responses within the range of IF signals.

14. The non-transitory computer readable storage medium of claim 13, wherein the noise floor level is computed for each of the IF signals.

15. The computer readable storage medium of claim 13, wherein the range of IF signals available for each of the RF input frequencies is determined based on a pass band of an IF filter.

16. The non-transitory computer readable storage medium of claim 15, further comprising providing the IF filter in series with an analog-to-digital converter that is followed by a digital processing circuit, wherein the digital processing circuit further provides filtering of an output of the analog-to-digital converter, and wherein the range of IF signals available for each RF input signal is further determined by the digital pass band of the filtering performed in the digital processing circuit.

17. The non-transitory computer readable storage medium of claim 16, further comprising: prior to taking a measurement of one of the RF input frequencies, an IF plan is determined and constituent oscillators are set to match the IF plan, bandwidth of the filter bandwidth is set to match the IF plan and a sampling clock of the analog-to-digital converter is set to match the IF plan.

18. The non-transitory computer readable storage medium of claim 15 wherein the IF filter is an anti-aliasing filter.

19. The non-transitory computer readable storage medium of claim 13, wherein the instructions for carrying out the step of determining for a plurality of RF input frequencies includes instructions for carrying of the step of:

generating a lookup table for each of the RF input frequencies, and wherein the lookup table specifies the range of IF signals available for each of the RF input signals, and the noise floor level for the IF signals as a function of bandwidth.

20. The non-transitory computer readable storage medium of claim 13 wherein an equation used to identify the spurious responses comprises: $f_{IF} - \Delta \leq n_1 \cdot f_1 \pm n_2 \cdot f_2 \pm \ldots \pm n_k f_k \leq f_{IF} + \Delta$, wherein $\Delta$ is the IF bandwidth region of concern, $f_{IF}$ is one of the frequencies within the IF bandwidth region, and $n_i$ are the weights of constituent frequencies $f_k$.

* * * * *